United States Patent [19]

Buisman

[11] Patent Number: 5,366,633
[45] Date of Patent: Nov. 22, 1994

[54] PROCESS FOR THE TREATMENT OF WATER CONTAINING SULPHUR COMPOUNDS

[75] Inventor: Cees J. Buisman, Harich, Netherlands

[73] Assignee: Paques B.V., Balk, Netherlands

[21] Appl. No.: 775,991

[22] PCT Filed: Apr. 11, 1991

[86] PCT No.: PCT/NL91/00059
§ 371 Date: Nov. 19, 1991
§ 102(e) Date: Nov. 19, 1991

[87] PCT Pub. No.: WO91/16269
PCT Pub. Date: Oct. 31, 1991

[30] Foreign Application Priority Data

Apr. 12, 1990 [NL] Netherlands ............... 9000877
Apr. 12, 1990 [NL] Netherlands ............... 9000878
Apr. 12, 1990 [NL] Netherlands ............... 9000879
Apr. 12, 1990 [NL] Netherlands ............... 9000880

[51] Int. Cl.$^5$ .................................. C02F 3/06
[52] U.S. Cl. .......................... 210/614; 210/615; 210/626; 210/631; 210/903
[58] Field of Search .......... 210/614, 620, 623, 626, 210/630, 631, 903, 615–618

[56] References Cited

U.S. PATENT DOCUMENTS

| | | | |
|---|---|---|---|
| 4,384,956 | 5/1983 | Mulder | 210/631 |
| 4,522,723 | 6/1985 | Kauffman et al. | 210/611 |
| 4,537,682 | 8/1985 | Wong-Chong | 210/614 |
| 4,584,271 | 4/1986 | Stern et al. | 210/616 |
| 4,655,924 | 4/1987 | Heijnen | 210/617 |

OTHER PUBLICATIONS

C. J. N. Buisman et al., "Optimization of sulphur production in a biotechnological sulphide-removing reactor", Biotechnology and Bioengineering, vol. 35, No. 1, pp. 50–56, Jan. 1990, John Wiley & Sons, New York.

J. P. Maree et al., "Biological Sulphate Removal in an Upflow Packed Bed Reactor", Water Research, vol. 19, No. 9, pp. 1101–1106, Sep. 1985, Pergamon Press, Oxford, GB.

J. P. Casey et al., "Treatment of high-sulfate waste by see-saw digester", Chemical Abstracts, vol. 103, No. 12, Sep. 12, 1985, Abstract No. 92376y.

*Primary Examiner*—Thomas Wyse
*Attorney, Agent, or Firm*—Young & Thompson

[57] ABSTRACT

A process is provided for the treatment of water containing sulphide wherein the sulphide is oxidized in an aerobic reactor having a minimum sulphide sludge load. The minimum sulphide load is at least 10 mg of sulphide per mg of the nitrogen present in the sludge per hour, the sludge load being calculated on the basis of the sulphide oxidizing part of the biomass. The minimum sulphide load may also be defined as 25 mg of sulphide per liter of reactor material per hour. The sulphide can be largely oxidized to elemental sulphur which is then separated and reused. Waste water also containing organic matter in addition to varying levels of sulphide is purified without interference of filamentous bacteria using a two step aerobic process. The process for sulphide removal can be used for the treatment of waste water having high levels of sulphur compounds such as sulphate, sulphite and thiosulphate by first reducing these sulphur compounds in an aerobic step. Heavy metals are removed from water by adding sulphide to the water and precipitating the metals as sulphides; the sulphide can be added by reducing sulphur compounds already present.

15 Claims, 3 Drawing Sheets

PROCESS FOR THE TREATMENT OF WATER CONTAINING SULPHUR COMPOUNDS

TECHNICAL FIELD

The present invention is in the field of waste water treatment. In particular, the invention relates to a process for the treatment of water containing sulphide or containing sulphur compounds having higher oxidation states such as sulphate, sulphite and thiosulphate which may also contain organic matter, wherein the sulphur compounds are oxidized in a reactor using sludge (biomass) containing aerobic bacteria. Furthermore, the invention relates to a process for the removal of heavy metals from aqueous effluents by precipitation of the heavy metals as sulphides.

BACKGROUND

The presence of sulphur compounds, such as sulphide, in waste water has many adverse consequences, such as:
  corrosive action on concrete and steel,
  high oxygen demand (COD), leading to oxygen depletion in the receiving water after discharge of the waste water, involving environmental polution and/or high environmental levies,
  toxic effects on man and animals,
  serious stench.

While sulphide can be removed from waste water by chemical oxidation, stripping and precipitation, biological purification methods have become increasingly important. Biological removal of sulphide can be performed using phototrophic sulphur bacteria (also accompanied by sulphur production) as well as using denitrifying bacteria. Sulphide can also be converted to sulphate by oxygen consuming bacteria in activated sludge. Sulphur production using oxygen consuming bacteria has advantages over the use of phototrophic bacteria since aerobic conversion proceeds much faster than anaerobic (phototrophic) conversion and light supply in a turbid sulphur reactor is not easy, whereas oxygen can be supplied in an aerobic reactor in a simple way without problems. Nitrate is necessary in the case of denitrifying bacteria.

Advantages of conversion of sulphide into sulphur rather than sulphate include:
  much less oxygen, and thus less energy is required,
  the process proceeds much faster,
  less biological sludge is produced,
  no sulphate or thiosulphate is discharged,
  there is the possibility of reusing the sulphur.

A process for the removal of sulphide from waste water by oxidation of the sulphide to elemental sulphur is known from Dutch patent application 8801009 according to which the production of sulphur can be promoted by using a lower oxygen supply than the stoichiometric amount that is needed for sulphate formation. Although a substantial amount of sulphur is produced using this known process, there is a need for improvement of this production, in order to minimize the discharge of soluble sulphur compounds such as sulphide and sulphate.

Another problem connected with biological waste water systems is that sulphide adversely effects the purification efficiency and the sludge retention during aerobic purification of waste water based on a process wherein activated sludge is used. One of the reasons is that sulphide oxidizing, filamentous bacteria such as those of the genera Thiothrix and Beggiatoa can develop in the treatment plants. These filamentous bacteria hamper an efficient settlement of sludge, causing sludge to wash out (bulking out). This has two undesired consequences: a: decrease of the activity of the waste treatment plant resulting in a lower purification performance; b: increase of levies as a result of the increase of the COD load by the washed-out sludge.

The presence of a high amounts of other sulphur compounds, for example a sulphur content of more than 350–500 mg S/l, or a sulphur related chemical oxygen demand (COD/S) of less than 10, in waste water also causes difficulties in the anaerobic treatment of the waste water, since the sulphide that is formed inhibits the methane producing bacteria. However, anaerobic purification of waste water generally has advantages over aerobic purification: low energy consumption, little sludge increase, methane production, etc. Thus, there is great need for a process allowing anaerobic purification of organic waste effluents, even when these contain high amounts of sulphur compounds.

A process for the anaerobic treatment of waste water containing sulphur compounds is known from European patent application 0.241.999, according to which waste water containing sulphate is purified anaerobically whereby sulphate is reduced to sulphide. The sulphide is then removed from the waste water in the form of hydrogen sulphide ($H_2S$). This process has drawbacks in that measures have to be taken (pH adjustment) to ensure that the sulphide is removed from the water to a sufficient extent, and in that the hydrogen sulphide must be subsequently separated from methane and any other gasses, which in turn leads to an effluent which cannot easily be utilized. Furthermore, intoxication of the anaerobic bacteria occurs as well, if the sulphide load is high.

It is generally known that the presence of heavy metals, even in a very low concentration, is undesirable because of the high toxicity for man, plants and animals. Conventional disposal methods, such as hydroxide formation and separation, reversed osmosis and ion exchange, are complicated or do not have the desired result.

A process of removing sulphur compounds and heavy metal ions from water is known from International patent application WO 80/02281. According to that process, sulphate reducing bacteria are cultured in fermentors in the presence of a nutrient solution and a part of the waste water to be treated, and the aqueous sulphide solution which is produced is fed to a precipitation tank together with the remaining bulk of the waste water. The metal sulphides settle in the form of a flocculent precipitate in the precipitation tank, in particular when the waste contains iron (III) ions. Pb, Hg, Cd, Fe, Cu, Ni, Zn, Co, Mn and Ag are mentioned among the metals that can be precipitated. However, this known process does not result in complete sulphate and/or sulphide removal.

SUMMARY OF THE INVENTION

It has been found that the production of sulphur can be promoted using a process for the purification of water containing sulphide wherein the sulphide is oxidized in a reactor using sludge containing aerobic bacteria, in which process a minimum sulphide load is maintained in the aerobic reactor.

In a first aspect of the invention, the process is characterized in that a sludge load of at least 10 mg of sulphide per mg of nitrogen present in the sludge per hour is used in the reactor, the sludge load being calculated on the sulphide oxidizing part of the biomass.

In a further aspect, the process is carried out in two steps, the first step comprising oxidation of at least a part of the sulphide to elemental sulphur in a first aerobic reactor using a minimum sulphide load, and the second step comprising further oxidation in a second aerobic reactor to sulphate.

In another aspect, the process is used for the treatment of water containing high levels of sulphur compounds, wherein the sulphur compounds are first anaerobically reduced to sulphide, and the sulphide thus produced is then oxidized in an aerobic reactor using a minimum sulphide load in the aerobic reactor.

In yet another aspect, the process is used for the removal of heavy metal ions, wherein the water is caused to contain sulphide ions which react with the heavy metal ions to form metal sulphides, whereafter the remaining sulphide is oxidized to elemental sulphur in an aerobic reactor using a minimum sulphide load in the aerobic reactor.

DETAILED DESCRIPTION OF THE INVENTION

The minimum sulphide load that is necessary in the process according to the invention is preferably expressed as the sulphide sludge load, i.e. the amount of sulphide that is present in the aerobic reactor per unit of time with respect to the mass of the sludge bacteria that oxidizes sulphide. The sludge load is at least 10 mg S per mg N per hour. Herein, the amount of bacteria (biomass) is determined on the basis of its nitrogen content. It was found, that a sulphide sludge load of less than 10 mg S/mg N.h leads almost exclusively to sulphate formation, which is generally not preferred since sulphate cannot be conviently separated from the treatment effluent, whereas elemental sulphur, which is formed at higher sludge loads, can be easily separated. Preferably, a sludge load of at least 20 mg S/mg N.h and more preferably of at least 30 mg S/mg N.h is used. A sludge load of about 35 mg S/mg N.h and higher appeared to result in exclusive production of elemental sulphur in most cases.

For the purpose of the present invention, sulphide is understood to comprise all inorganic ionic or non-ionic species of divalent sulphur such as sulphide ($S^{2-}$), hydrosulphide ($HS^-$), hydrogen sulphide ($H_2S$) and the corresponding polysulphide species.

Waste water is to be understood as denoting any aqueous fluid containing at least one component, such as a sulphur compound, that is to be removed from it.

The sludge used in the aerobic reactor contains sulphur oxidizing bacteria, for example of the genera Thiobacillus and Thiomicrospira.

The sludge load to be used in the process of the invention can be achieved by selecting the appropriate retention time of the waste water in the aerobic reactor or by adjusting other parameters such as the amount of sludge in the reactor, the sulphide concentration in the waste water, or the oxygen concentration.

It was found that the oxygen concentration is not critical in the process of the present invention. It can vary over a broad range and will preferably be situated in the range of 0.1–9.0 mg $O_2$, more preferably about 4 mg $O_2$, per liter of material present in the reactor.

The sludge load according to the process of the invention is unexpectedly high when compared with known processes. This is illustrated in table A. In conventional aerobic processes, the sludge load is below 0.1 mg S/mg N.h.

TABLE A

| Sulphide sludge load (mg S/mg-N.h) | Sulphur production as percentage of total sulphide load |
|---|---|
| 0–10 | 0 |
| 10–20 | 0–75 |
| 20–30 | 75–95 |
| 30–35 | 95–100 |
| >35 | 100 |

In table A, the amount of sludge (biomass) is expressed as the nitrogen content of the bacteria. In order to calculate the dry mass content from this expression, the number must be multiplied by a factor of 8.3. It clearly follows from table A, that it is possible to convert the total sulphide content into sulphur by using a sludge load above 35 mg S/mg-N.h.

The process of the invention is preferably carried out in such a way, that a biomass is used in the reactor which is present in the form of biofilms that are bound to a carrier material. Suitable carrier materials include any polymeric or other material known for this purpose, such as polyurethane, polyethylene, polypropylene, PVC etc.

Preferably, the process yields elemental sulphur as the only or virtually the only sulphur product. This can be conveniently separated from the aqueous effluent by filtration, centrifuging, settling etc. In order to avoid the production of higher oxidized sulphur species, the sulphide concentration in the effluent of the sulphur producing reactor is kept at a minimum level which is still acceptable; preferably this concentration is in the range of 0.5–30 mg $S^{2-}$ per liter of effluent.

The values as mentioned in table A only apply to waste water flows which do not contain organic matter. When organic matter is present in the waste water, an additional biomass that does not oxidize sulphide will grow, causing the nitrogen content of the total biomass to become higher than the content upon which table A is based. In case organic substances are present in the waste water, the sulphide surface load (wherein the surface is understood to be the biofilm surface) may be used as the determining parameter for the degree of conversion of sulphide into elemental sulphur. The values of this parameter ere mentioned in table B.

TABLE B

| Sulphide surface load (g S/m$^2$ · day) | Sulphur production as percentage of the total sulphide load |
|---|---|
| 0–10 | 0–80 |
| 10–20 | 80–95 |
| 20–25 | 95–100 |
| >25 | 100 |

Thus, the process according to the invention is preferably carried out at a sulphide surface load of at least 10 g S/m$^2$.day end more preferably between 20 and 25 g S/m$^2$.day. When there is no organic matter present, the values given in table A can be used.

It was found, that the pH in the aerobic reactor should not exceed 9.0 in the process of the invention. The lower limit of the pH is not critical; it may be well below 5, since sulphide oxidizing bacteria are known to grow at a pH as low as 0.5.

The minimum sulphide load in the reactor necessary for achieving an effective sulphide conversion can also be applied in a two step process wherein
a) at least a part of the sulphide is oxidized to elemental sulphur in a first aerobic reactor,
b) the liquid obtained in step a), which contains elemental sulphur and possibly sulphide end other components, is fed into a second aerobic reactor wherein sulphur and sulphide are oxidized to sulphate. A separation step may be interposed between steps a) and b) to remove the major part of sulphur in elemental form.

This is particularly advantageous when purifying water which under normal treatment conditions would lead to the undesirable growth of filamentous bacteria such as those of the genera Thiothrix and Beggiatoa. This may be the case with water containing relatively high amounts of organic waste, in addition to sulphide. The minimum sulphide load can be expressed as a minimum amount of sulphide per weight unit of biomass per hour, as defined above. It can also be expressed as a minimum amount of sulphide per liter of material present in the first aerobic reactor per hour. In this case the minimum sulphide load is 25 mg S/l.h.

It is surprising that an increase of the sulphide load of the first aerobic reactor, i.e. an increase of the sulphide concentration, a reduction of the treatment time and/or a reduction of the treated volume, would improve the efficiency both of the sulphide removal itself and of the second aerobic treatment of other pollutants. In particular, the present process permits an improved sludge retention in the second aerobic purification step. This is illustrated in table C, which shows test results obtained using a reactor as described in Dutch patent application 8801009 (for the conversion of sulphide to sulphur).

TABLE C

|  | Result after two weeks | |
| --- | --- | --- |
|  | COD-efficiency | Bulking out |
| two-step process (invention) | 76 | very little |
| one-step process (conventional) | 52 | extensive |

The effect of the variation of the process parameters on the efficiency of sulphide removal and the growth of filamentous bacteria is illustrated in table D.

TABLE D

| Flow rate (l/h) | Hydraulic retention time (h) | Influent sulphide concentration (mg $S^{2-}$/l) | Sulphide load (mg $S^{2-}$/l·h) | Effluent sulphide concentration (mg $S^{2-}$/l) | Growth of Thiotrix/Beggiatoa |
| --- | --- | --- | --- | --- | --- |
| 75 | 0.3 | 140 | 525 | 14 | − |
| 15 | 1.3 | 140 | 105 | 25 | − |
| 1.5 | 13.3 | 140 | 10.5 | 0.5 | ++ |
| 15 | 1.3 | 25 | 18.8 | 2.0 | ++ |
| 71 | 0.3 | 3.0 | 10.5 | 0.0 | ++ |

It follows from table D that the hydraulic retention time alone and the waste water sulphide concentration alone do not directly determine the performance of the first aerobic purification. On the contrary, a considerable growth or undesired filamentous, sulphur oxidizing bacteria occurs at a sulphide load of less than about 20 mg/$S^{2-}$ l.h. Thus, the minimal sulphide load in the present process should be 25 mg S/l.h. The sulphide load is preferably at least 50 mg S/l.h and more preferably at least 100 mg S/l.h. A sulphide load exceeding 1000 mg S/l.h will not be used in general, since this would result in unacceptable flow rates. Thus, highly concentrated waste streams will preferably be diluted before purification.

The oxidation of sulphide in the two step process may result in elemental sulphur and/or sulphate, depending on the retention time and the oxygen concentration. In most cases, it is advantageous to oxidize the sulphide to sulphur, since the latter can be removed more conveniently by settling, centrifuging, flocculation or filtration. For this purpose, a limiting amount of oxygen is used.

The sulphide is oxidized in the first aerobic reactor of relatively small size and having a high flow rate (retention time: several tenths of minutes to several hours), and the other oxidizable components are subsequently removed in an aerobic reactor of a relatively large size and having a long retention time (for example 24 hours).

A device for separating elemental sulphur can be located between the two reactors. As a result, a waste water effluent is obtained which is largely or completely free of sulphur compounds.

The process according to the invention can also be used for the anaerobic treatment of waste water, even if it contains very high amounts of sulphur compounds, whereby it is freed from sulphur compounds to a high degree. The sulphur compounds are reduced to sulphide in an anaerobic reactor and the sulphide is subsequently removed by oxidation to elemental sulphur as described above. When the concentration of sulphur compounds in the water that is to be treated is very high, a portion of the purified water is preferably recycled to the water to be purified. Preferably the recycling ratio (ratio between the amount of purified water that is recycled to the anaerobic reactor and the amount of purified water that is discharged) is chosen so as to keep the sulphur content in the anaerobic reactor below 800 mg S/l, more preferably below 500 mg S/l, and most preferably below 350 mg S/l.

The process can be used for treating waste flows containing various sulphur compounds in almost any concentration. The sulphur compounds may be inorganic sulphur compounds, such as sulphate, sulphite, thiosulphate, tetrathionate, elemental sulphur and the like, as well as organic sulphur compounds such as carbon disulphide, dialkyl sulphides, dialkyl disulphides, merceptans, sulphones, sulphoxides, sulphonic acids and the like. The process is particularly advantageous for the treatment of water containing sulphate, sulphite or thiosulphate.

Suitable bacteria for reducing sulphur compounds to sulphide include especially sulphur end sulphate reducing bacteria, such as species of the genera Desulfovibrio, Desulfotomaculum, Desulfomonas, Desulfobulbus, Desulfobacter, Desulfococcus, Desulfonema, Desulfosarcina, Desulfobacterium and Desulforomas. In general, these bacteria are available from various anaerobic cultures and/or grow spontaneously in the anaerobic reactors.

As a result of the partial recycling of the purified effluent to the influent, the sulphide concentration in the anaerobic treatment is decreased in such a way that the anaerobic flora (especially the methane producing bacteria) are not inhibited.

A further advantage of this embodiment is that the pH of the partially purified waste water does not need to be lowered in order to allow the sulphide to be removed. Furthermore, there is no need for gas scrubbers that would in turn produce secondary effluents.

By selecting the appropriate recycling ratio, any type of waste water having any concentration of sulphur can be treated. The recycling ratio can vary over a wide range and may for example be 1-10. When treating waste water having a high sulphur load, a relatively large portion of purified water is recycled. Thus, waste water containing for example 30 g/l of COD and 2 g/l of sulphur compounds (calculated as sulphur) can effectively be treated with the process according to the invention.

An apparatus suitable for carrying out the purification process comprises an anaerobic treatment reactor linked to a reactor for the oxidation of sulphide to elemental sulphur and a separator for separating elemental sulphur, and further a conduct for feeding a portion of the separator effluent to the anaerobic reactor.

Figure 1:
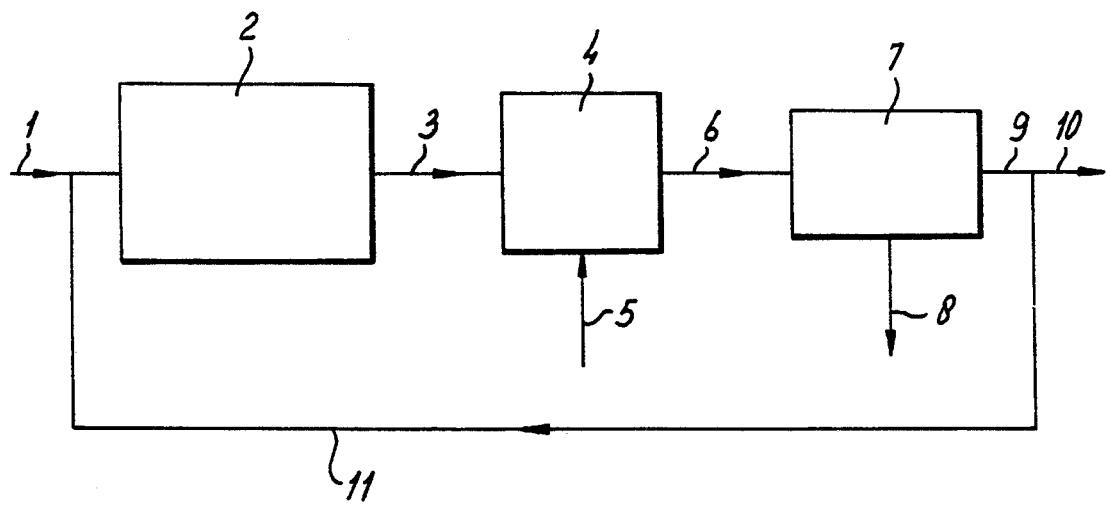
FIG. 1 is a schematic illustration of a treatment plant for the removal of sulphur.

The process for the removal of sulphur compounds can for example be carried out in a treatment plant as schematically shown in the accompanying FIG. 1. According to FIG. 1, a waste water flow 1 is fed into an anaerobic reactor 2, wherein organic pollutants are converted mainly into methane and the sulphur compounds are converted into sulphide. The gasses formed are led away from the anaerobic reactor 2 through a conduct (not shown). The anaerobic reactor is connected through a conduct 3 with an oxidation reactor 4, where the sulphides produced are converted into elementary sulphur by sulphur oxidizing bacteria under such conditions (minimum sulphide load, oxygen concentration) that oxidation necessarily leads to sulphur. Oxygen is introduced through 5 at an appropriate rate. The reactor optionally contains a support for the sulphur oxidizing bacteria. The retention time in the reactor 4 is relatively short (for example less than 20 minutes). Conduct 6 leads the water that has been treated in the reactor 4 to a separator 7, where the sulphur produced is separated through 8. The treated waste water is subsequently divided into a production flow 10 and a recycle flow 11; the ratio between these flows is adjusted at 1 in accordance with the properties of the waste water to be treated.

In the process according to the invention for the removal of heavy metal ions from water which may also contain sulphur compounds, the water is caused to contain sulphide ions which react with the metal ions to form metal sulphides, and the remaining sulphide is oxidized to elemental sulphur in an aerobic reactor using a minimum sulphide load as described above.

The sulphide ions that are necessary for the production of the metal sulphides may be added to the reactor influent. Advantageously, the sulphide ions are generated in the water by anaerobic reduction of sulphur compounds that may already be present in the water to be treated and/or may be added. If a sulphur compound must be added, elemental sulphur is preferred.

Preferably, a sulphur/metal ratio is used in the anaerobic step which is sufficient to ensure a substantially complete precipitation of the heavy metals. Thus, all heavy metal ions are captured by sulphide in the anaerobic step.

It is preferred that the metal sulphides and elemental sulphur formed during the purification process are separated together, for example by settling, filtration, centrifugation or flotation.

It may be desirable to add a nutrient (electron donor) in order to reduce the sulphur compounds to sulphide. In the case of treating water which does not contain organic waste, the addition of such an electron donor is necessary. Depending on the particular use, the following nutrients can be added: hydrogen, carbon monoxide and organic compounds such as formic acid, sugars, fatty acids, alcohols and starches. If necessary, nutrient elements in the form of nitrogen, phosphate and trace elements are added as well.

Examples of waste water containing heavy metals that can be treated using the process of the invention are ground water, mine effluents, industrial waste water, for example from the photographic industry and metallurgy, and effluents of waste gas scrubbers. Heavy metals that can be removed using the process of the invention include all metals having a low solubility product of the corresponding sulphide. Examples are lead, tin, bismuth, cadmium, mercury, silver, zinc, copper, nickel, cobalt, iron, manganese, chromium, vanadium and titanium.

The retention time of the metal sulphides in the aerobic step should be sufficiently short to prevent excessive oxidation; when oxidation of sulphide is carried out to completeness, the metal sulphides cannot be maintained as a precipitate.

By maintaining a low residual sulphide concentration in the aerobic step (the micro-aerophilic sulphide oxidation) and in the separation step where elemental sulphur and grown biomass are separated from the water flow, redissolution of the metals is prevented. This concentration can vary over a wide range and can for example be 0.1-50 mg/l, preferably 1-10 mg of sulphide/l. Maintaining the required sulphide concentration can for example be controlled by measuring the sulphide concentration or the redox potential in the aerobic reactor or in the separator. The redox potential should preferably be negative during sulphide oxidation and separation, for example below −100 mV. It is noted that the redox potential during the first step, i.e. the anaerobic sulphur reducing step, should generally have a value in the range of −200 to −400 mV.

Any sulphide ions remaining after the separation step can be oxidized for example to sulphate in a way known per se (for example by aeration or peroxide addition) before discharge.

Figure 2:
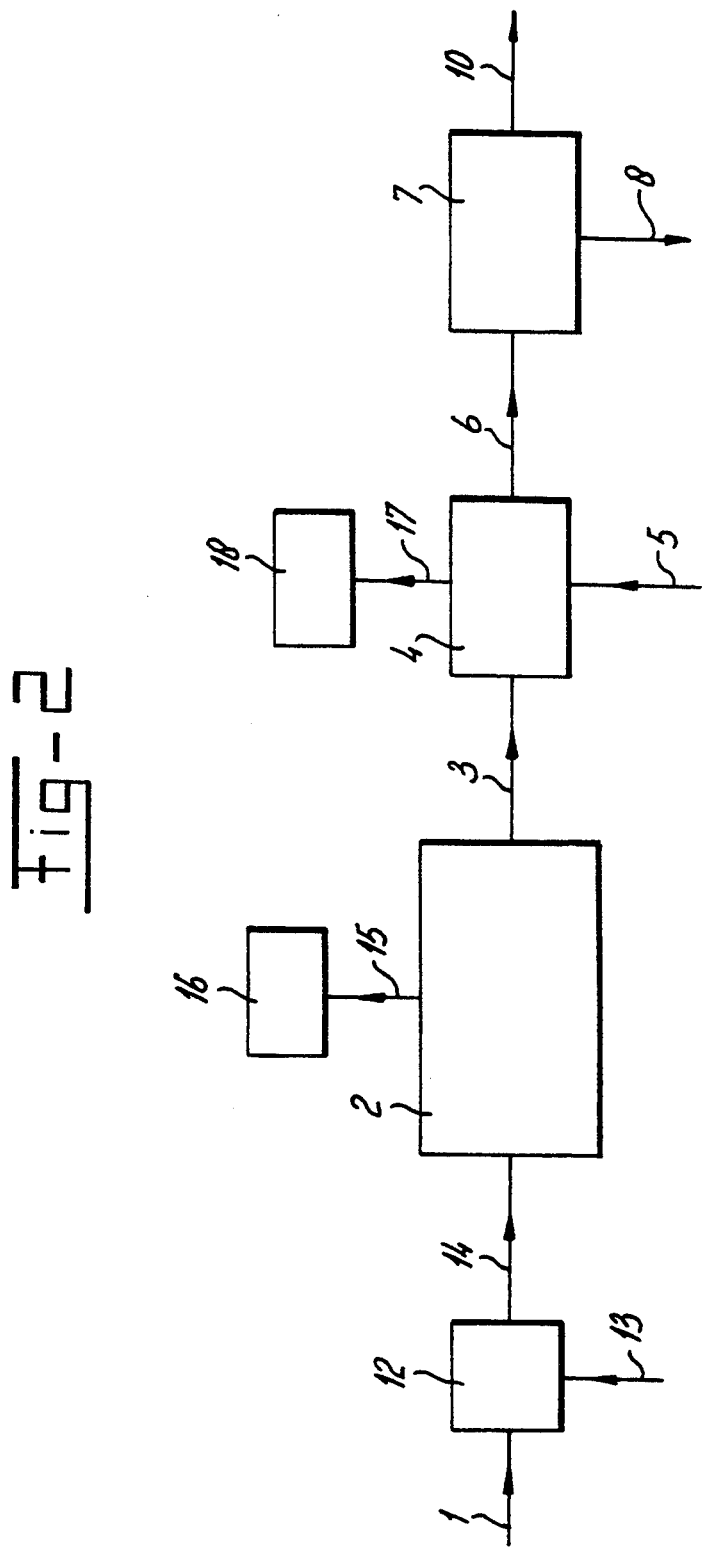
FIG. 2 is a schematic illustration of a treatment plant for the removal of heavy metals.

The process for heavy metal removal according to the invention can for example be carried out in an apparatus such as schematically depicted in the accompanying FIG. 2. According to FIG. 2, the waste water flow to be treated (influent) 1 is fed to a buffer/mixing tank 12. Nutrients and electron donor can be added through 13. The liquid is removed from the buffering tank through 14 and fed to an anaerobic reactor 2, wherein the sulphur compounds are reduced to sulphide and metal sulphides are formed. These are drained off at the bottom of reactor 2 (not shown). The gasses produced during this anaerobic process ape conducted through 15 to a gas treatment apparatus 16, where combustion or elimination of H$_2$S can be effected. The sulphide containing liquid produced in reactor 2 is conducted through 3 to an aerobic reactor 4, where the oxidation of sulphide to elemental sulphur occurs. Air is introduced into the aerobic reactor 4 through 5. Gas is conducted through 17 to a stench treatment apparatus 18.

The liquid which contains sulphur is removed from the aerobic reactor 4 through 6 and fed to separator 7 for separating sulphur. Sulphur is separated through 8, whereas the purified effluent leaves the separation apparatus 7 through 10.

Measuring results relating to a treatment system operated according to the process of the invention are summarized in tables E and F below.

TABLE E concentrations of main components in the heavy metal removal

| step FIG. 2 | zinc (mg/l) | sulphate (mg/l) | sulphide (mg/l) | sulphur (mg/l) | ethanol (mg/l) | redox (mV) |
|---|---|---|---|---|---|---|
| influent (1) | 145 | 960 | 0 | 0 | 500 | +150 |
| a (3) | 0.5 | 10 | 245 | 0 | <10 | −410 |
| b (6) | <0.1 | 15 | 4 | 205 | <1 | −300 |
| effluent (10) | <0.1 | 15 | 3 | 5 | <1 | −200 | a = after anaerobic step; b = after aerobic step

The ethanol in the influent has been added; about 350 mg/l of metal sulphide precipitate is formed as well.

TABLE F concentrations of other metals in influent and in effluent

| metal | in influent (mg/l) | in effluent (mg/l) |
|---|---|---|
| cadmium | 0.95 | <0.01 |
| total iron | 25 | 0.05 |
| lead | 46 | <0.01 |
| copper | 0.57 | <0.02 |
| cobalt | 0.10 | <0.015 |
| nickel | 0.10 | <0.015 |
| manganese | 7.0 | 3.5 |
| magnesium | 15 | 7 |
| calcium | 410 | 275 |
| aluminium | 10 | 1 |

EXAMPLE

In order to assess the relation between the sulphur and/or sulphate production and the sulphide sludge loading rate in a sulphide removal plant, the sulphur formation was measured in a number of steady state situations.

In this experiment only sulphide and nutrients, but no organic compounds were fed to the reactor, so that the N content was determined by the sulphide oxidizing biomass only.

Figure 3:
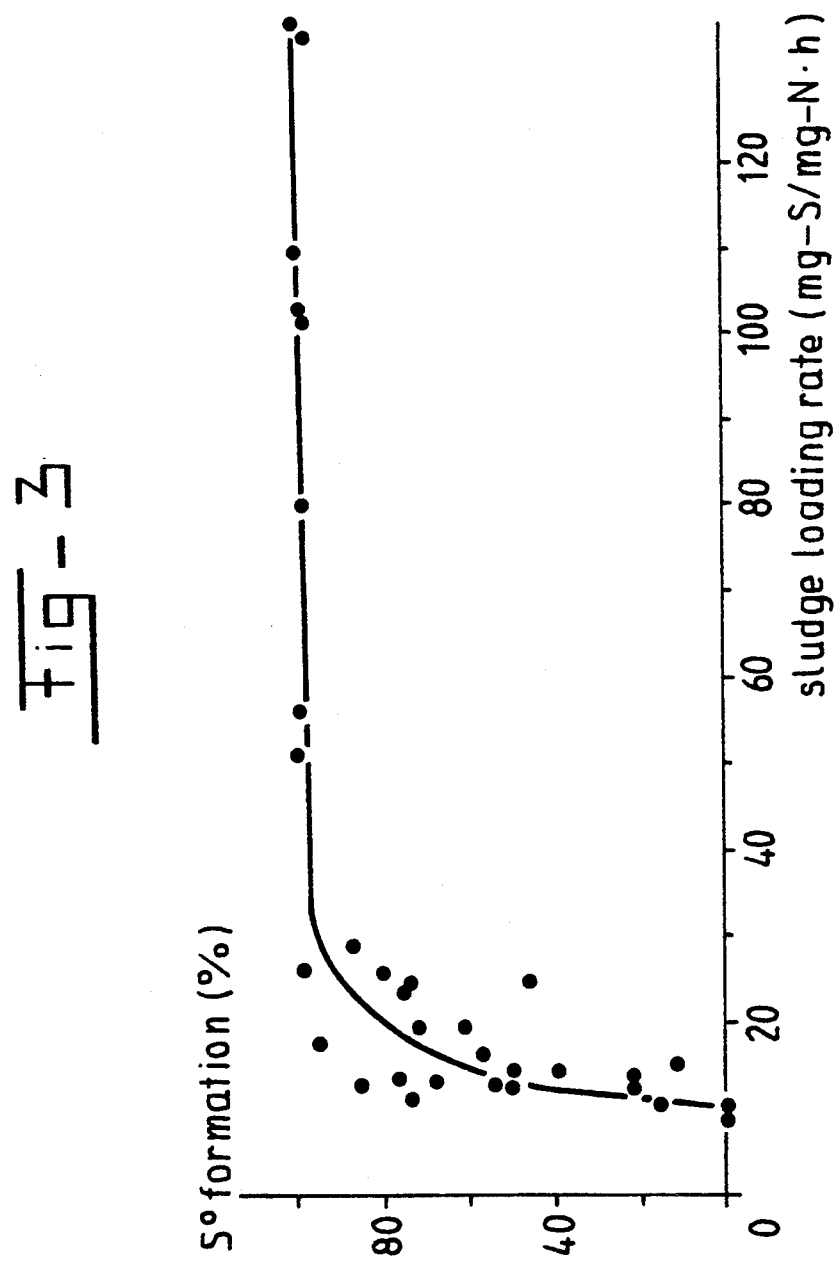
FIG. 3 is a graph of the relationship between sulphur or sulphate production and sulphide sludge loading rate.

The results are shown in FIG. 3. Below 10 mg S/mg N.h. merely sulphate is formed. At sludge loading rates exceeding 10 mg S/mg N.h. the sulphur production is increasing.

The nitrogen content of the sulphide oxidizing bacteria was measured with a modified Kjeldahl method developed by Novozamsky et al. (1983), Comm. Soil Science Plant Anal. 14, 239–249.

I claim:

1. Process for the purification of waste water containing sulfide which comprises: subjecting said waste water to an oxidation treatment in a reactor using sludge containing aerobic bacteria, using a sludge load of at least 10 mg of sulfide per mg of nitrogen present in the sludge per hour in the reactor whereby the sulfide is substantially oxidized to elemental sulfur, said sludge load being calculated on the basis of the sulfide oxidizing part of the sludge.

2. Process according to claim 1, wherein the waste water contains no organic matter, and a sludge load of at least 20 mg of sulfide per mg of nitrogen present in the sludge per hour is used.

3. Process according to claim 2, wherein a sludge load of at least 35 mg of sulfide per mg of nitrogen present in the sludge per hour is used.

4. Process according to claim 1, wherein the sludge used in the reactor is present in the form of biofilms which are bound to a carrier material.

5. Process according to claim 1, further comprising adjusting the oxygen concentration in the reactor to a value in the range of 0.1–9.0 mg/l.

6. Process according to claim 5, wherein the oxygen concentration is about 4 mg/l.

7. Process according to claim 1, further comprising maintaining a sulfide concentration in the effluent of the aerobic reactor within the range of 0.5–30 mg/l.

8. Process according to claim 1, wherein said waste water contains organic matter, and a sulfide surface load of at least 10 g/$m^2$.day is used.

9. Process according to claim 8, wherein a sulfide load of at least 50 mg S/l.h is used.

10. Process according to claim 9, wherein a sulfide load of at least 100 mg S/l.h is used.

11. Process for the purification of waste water containing sulfide, wherein
   a) at least a part of the sulfide is oxidized to elemental sulfur in a first aerobic reactor using the process according to claim 1, and
   b) feeding liquid obtained after step a) into a second aerobic reactor wherein sulfur and any remaining sulfide are oxidized to sulfate.

12. Process according to claim 11, further comprising a step of separating off elemental sulfur between steps a) and b).

13. Process for the purification of waste water containing sulfide which comprises:
   a) oxidizing at least a part of the sulfide to elemental sulfur in a first aerobic reactor using a sulfide load of at least 25 mg S/l.h, and
   b) feeding liquid obtained after step a) into a second aerobic reactor wherein sulfur and any remaining sulfide are oxidized to sulfate.

14. Process according to claim 13, wherein a sulfide load of at least 50 mg S/l.h is used in step a).

15. Process according to claim 13, wherein a sulfide load of 100–1000 mg S/l.h is used in step a).

* * * * *